Fig. 1

Nick A. Schuster
INVENTOR

BY Edward M. Roney
ATTORNEY

Nick A. Schuster
INVENTOR
BY Edward M. Roney
ATTORNEY

Nick A. Schuster
INVENTOR

BY Edward M. Roney
ATTORNEY

July 22, 1969 N. A. SCHUSTER 3,457,498
METHODS AND APPARATUS FOR IMPROVING THE RESOLUTION OF
WELL LOGGING MEASUREMENTS
Filed June 5, 1967 8 Sheets-Sheet 4

Nick A. Schuster
INVENTOR

BY Edward M. Roney
ATTORNEY

Nick A. Schuster
INVENTOR

BY Edward M. Roney
ATTORNEY 3,457,498
METHODS AND APPARATUS FOR IMPROVING THE RESOLUTION OF WELL LOGGING MEASUREMENTS
Nick A. Schuster, Houston, Tex., assignor to Schlumberger Technology Corporation, Houston, Tex., a corporation of Texas
Filed June 5, 1967, Ser. No. 643,560
Int. Cl. G01v 3/18
U.S. Cl. 324—1
14 Claims

ABSTRACT OF THE DISCLOSURE

The disclosure describes a technique for processing well logging signals to obtain improved indications of a subsurface characteristic. This is accomplished by a computational process wherein a measurement signal derived at one depth level in the borehole is subtracted from a measurement signal derived at a second depth level located a specified distance from the first depth level. The resulting difference signal is combined with at least one other signal to produce a computed signal having better resolution than the original measurement signals. The other signal which is combined with the difference signal is a computed signal for another depth level in the borehole which was stored earlier and is read out for combination with the difference signal. Other embodiments show the combining with the difference signal of more than one of the previously computed signals. The disclosure explains how improved system resolution may be obtained for various downhole investigating apparatus.

---

This invention relates to signal processing methods and apparatus for processing well logging measurement signals for providing improved indications of subsurface conditions or characteristics.

In the logging of subsurface earth formations surrounding a borehole drilled into the earth, investigating apparatus is moved through the borehole and investigates the surrounding earth formations to provide an output signal which varies in accordance with variations of the investigated characteristic of the adjoining each formations. In induction logging, for example, the output signal varies in accordance with the electrical resistivity or conductivity of the subsurface earth formations. In any case, it is often desirable that the investigating apparatus respond to only a relatively limited portion of the formation material which is adjacent the apparatus at any given instant. For example, it is frequently desired that the vertical resolution of the investigating apparatus be sensitive to only a limited vertical interval of the adjoining earth formations. By so doing, earth formation beds can be more accurately investigated.

When speaking of vertical resolution of an investigating apparatus, the vertical geometrical factor (hereinafter called V.G.F.) is frequently utilized to more accurately describe this vertical resolution. The V.G.F. of an induction logging type investigating apparatus, for example, can be defined as the relative response of the investigating apparatus as a function of relative borehole depth as the investigating apparatus passes from $-\infty$ to $+\infty$ through a thin conductive bed extending radially outward from the borehole to infinity and surrounded by beds of zero conductivity. To make it easier to use, the V.G.F. is usually normalized to "one". Thus, $$\int_{-\infty}^{+\infty} X dz$$

is made equal to "one" where $X$ is the relative response and $dz$ is a depth increment along the borehole axis. This same procedure can be used to find the V.G.F. if other formation characteristics than conductivity (or its reciprocal, resistivity) are being investigated, i.e., if other than induction logging type investigating apparatus is being utilized.

However, many investigating apparatus respond to a greater vertical region than desired (i.e., they do not have the most desirable V.G.F.). One technique for correcting this is to provide additional transducer elements in the downhole investigating apparatus to compensate for or to cancel the undesired portion of the response so that the effective vertical resolution of the apparatus is substantially improved. For example, in logging by electromagnetic principles, which is referred to as induction logging, so-called "focusing" coils are added to the downhole investigating apparatus to cancel to a large extent the response of the apparatus to the so-called "shoulder" regions lying immediately above and below the desired vertical region of response of the investigating apparatus. However, further problems arise whenever additional transducer elements are added. One such problem is that more apparatus must be placed in the downhole investigating apparatus thus making the downhole investigating apparatus more complex and usually more expensive. Because of hostile environment downhole it is desirable to move complexities to the surface. Other problems concerning the quality of the measurement may also occur. For example, in induction logging, as more coils are added to improve the vertical focusing, the depth of investigation of the apparatus in a horizontal or radial direction tends to decrease.

Another way of improving the effective vertical resolution of the downhole investigating apparatus is by utilizing the signal processing or computing techniques set forth in U.S. Patent No. 3,166,709 granted to H. G. Doll on Jan. 19, 1965. This Doll patent teaches the principle of temporarily storing or memorizing well logging signals obtained at various vertically spaced depth levels in the borehole. These stored signals are then combined in an appropriate manner to produce a resultant signal corresponding to the signal that would have been obtained with an investigating apparatus having better vertical resolution. This process is sometimes referred to as "computed focusing." The resultant signal is a computed signal and the relative depth levels corresponding to the stored signals which are being combined at any given instant are called computing stations. These computing stations are defined relative to the investigating apparatus, and therefore effectively move through the borehole as the investigating apparatus moves through the borehole. The relative depth level to which the resultant signal is referenced is called the center point or recording point of the investigating system.

In following the teachings of the above-named Doll patent, it would sometimes be desirable to provide computing stations at a large number of measurement levels in the borehole such as in those cases where the total signal received by the investigating apparatus is made up of contributions from a relatively great distance from the center point or recording point of the downhole investigating apparatus. However, to accomplish this, a relatively large capacity memory would be required to store the necessary number of well logging measurement signal samples.

Another way of improving the vertical resolution by signal processing techniques is the technique shown in copending application Serial No. 605,424 by Nick A. Schuster, the same inventor as the present application, filed on December 28, 1966. Among other things, this technique enables the use of a much larger effective number of computing stations for a memory system of given capacity. In a more general sense, it enables more sophisticated forms of signal processing to be performed with a relatively small memory system of convenient size for use at the well site. The present application describes a further technique which utilizes the general teachings of the copending application to obtain further improvements in certain situations.

It is an object of the invention, therefore, to provide new and improved methods and apparatus for processing well logging measurement signals wherein more accurate measurements can be obtained.

It is another object of the invention to provide new and improved well logging signal processing methods and apparatus for providing well logging measurements having sharply focused vertical geometrical factors.

In accordance with one feature of the present invention, apparatus for processing well logging signals comprises means for deriving signals representative of a characteristic of earth formations surrounding a borehole at different depth levels in the borehole and first memory means for storing the derived signals. The apparatus further comprises means for reading out the stored derived signals and means for substracting derived signal from another and combining the resulting difference signal with at least one other signal to provide computed signals representative of the formation characteristic at different depth levels correlated with the depth levels of the derived signals. The apparatus further comprises second memory means for storing the computed signals and means for reading out individual stored computed signals from the second memory means at later times and supplying at least one of the read-out computed signals to the combining means to provide said at least one other signal which is combined with any given derived signal. The read-out computed signals operate to cancel selected formation response portions of the derived signal (i.e., cancel a portion of the V.G.F.) so that the computed signals will have a sharp vertical response, i.e., a sharp or narrow V.G.F.

In accordance with another feature of the present invention, a method of processing well logging signals comprises deriving signals representative of a characteristic of earth formations surrounding a borehole at different depth levels in the borehole and storing the derived signals. The method further comprises reading out the stored derived signals and substracting one derived signal from another and combining the resulting difference signal with at least one other signal to provide computed signals representative of the formation characteristic at different depth levels correlated with the depth levels of the derived signals. The method further comprises storing the computed signals and reading out individual stored computed signals at later times and using at least one of the read-out computed signals to provide said at least one other signal which is combined with any given derived signal. By so doing, the computed signals will have sharp vertical responses, i.e., sharp V.G.F.'s.

For a better understanding of the present invention, together with other and further objects thereof, reference is had to the following description taken in connection with the accompanying drawings, the scope of the invention being pointed out in the appended claims.

Referring to the drawings.

Figure 1:
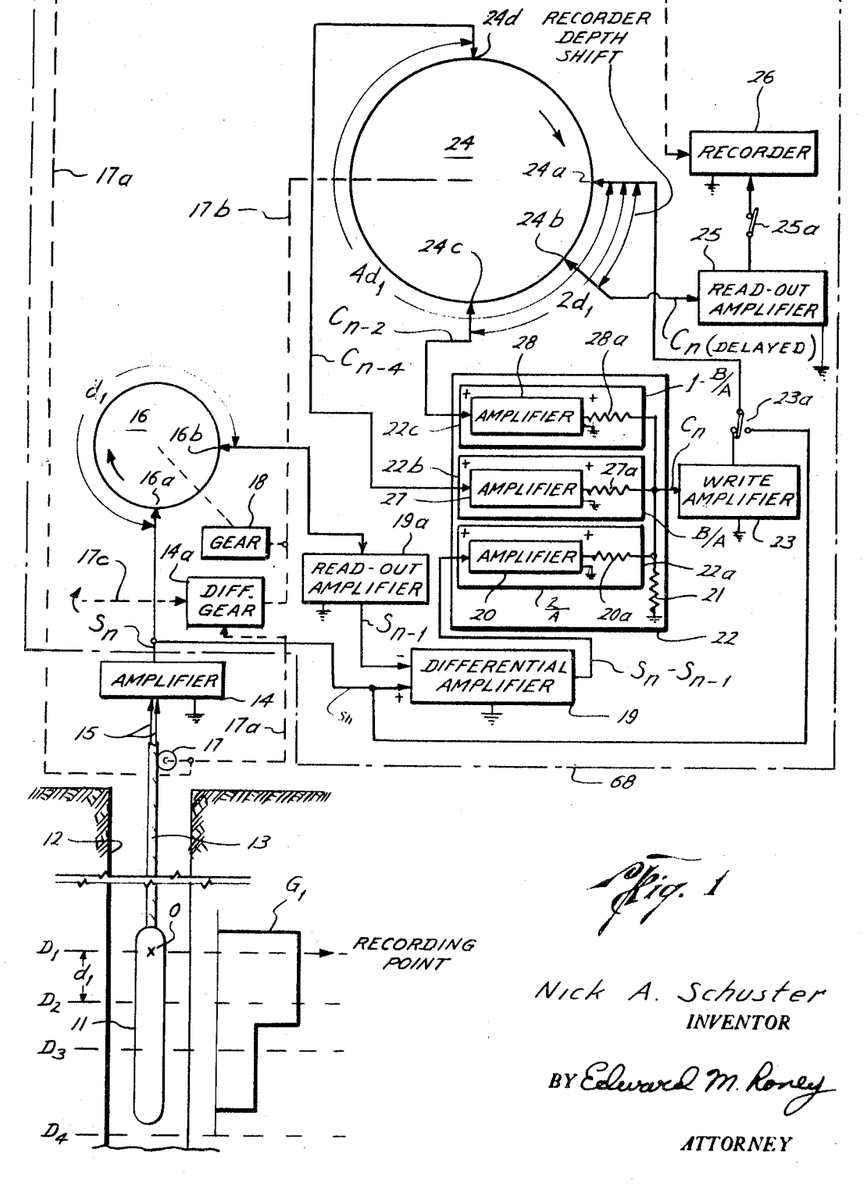
FIGURE 1 shows an investigating apparatus in a borehole along with a schematic representation of one embodiment of electrical circuitry for processing the well logging signals derived from the well logging apparatus.

Referring now to FIGURE 1, there is shown a downhole investigating apparatus 11, having a measurement center point or recording point "O," supported in a borehole 12 on the end of a cable 13. Shown opposite the investigating apparatus 11 is a V.G.F. $G_1$ which is considered to be the V.G.F. of investigating apparatus 11. The V.G.F. $G_1$ represents the relative response of the apparatus to the various adjacent formation regions with respect to their vertical location relative to the recording point "O." The V.G.F. $G_1$, in effect, moves in conjunction with the investigating apparatus 11 and when the investigating apparatus 11 is in the position shown, the center or recording point is deemed to be at depth $D_1$. The downhole investigating apparatus 11 supplies signals indicative of the investigatng characterstic to the input of an amplifier by way of a conductor pair 15 which passes through the armored multiconductor cable 13.

Amplifier 14 supplies the ground reference to the derived well logging signals and could comprise a differential amplifier, for example. The derived well logging signal output of amplifier 14, designated $S_n$, is supplied to one contact of a double-throw switch 23a and to a write-in contact 16a of a rotating memory 16, which rotates in accordance with the movement of the downhole investigating apparatus 11 through the borehole 12, and to the positive input of a differential amplifier 19. Rotating memory 16 may comprise any known type of memory such as, for example, the rotating magnetic memory with the associated write-in and read-out circuits shown in the above-mentioned Doll patent, or the rotating capacitor memory shown in U.S. Patent No. 3,230,445 granted to W. J. Sloughter et al. on Jan. 18, 1966, with the associated read-in and read-out circuits. Or alternatively, it could comprise the stepping relay type capacitor memory shown in U.S. Patent No. 3,181,117 granted to W. J. Sloughter on Apr. 27, 1965. This rotation is accomplished through the means of a wheel 17 which engages the cable 13 in a suitable manner so as to impart rotation to a shaft 17a proportional to the movement of the cable 13 past the wheel 17, and thus proportional to the movement of investigating apparatus 11 through the borehole. Shaft 17a is coupled to the input of a differential gear 14a whose output shaft 17b is coupled through a gear 18 to drive the rotating memory 16. A shaft 17c is also coupled to the input of differential gear 14a.

Located on the periphery of rotating memory 16 a clockwise interval $d_1$ from write-in contact 16a is a read-out contact 16b, which supplies a read-out derived signal $S_{n-1}$ to the high impedance input of a suitable read-out amplifier 19a, whose output is connected to the negative input of a differential amplifier 19. Differential amplifier 19 subtracts $S_{n-1}$ from $S_n$, and thus could comprise any suitable subtracting circuit. The output of differential amplifier 19, designated $S_n-S_{n-1}$, is supplied to the input of an amplifier 20 whose output is connected through a resistor 20a and a resistor 21 to ground. Amplifier 20 and resistor 20a comprise a weighting function circuit 22a of a weighted adding network 22, the circuit 22a providing a weight of 2/A. The output of weighted adding network 22 (the non-grounded side of resistor 21), designated $C_n$, is supplied to the input of a write amplifier 23 having a high input impedance. The low impedance output of write amplifier 23 is supplied to one contact of a double-throw switch 23a, whose common or switching contact is connected to a write-in contact 24a of a second rotating memory 24, which is driven by shaft 17b.

Located a short clockwise interval around the periphery of rotating memory 24 is a first read-out contact 24b which supplies the delayed computed signal $C_n$ to a read-out amplifier 25, whose output is supplied through a single-throw switch to the input of a recorder 26 for recording. The recording medium of recorder 26 is also driven by shaft 17a so that the well logging signals are recorded as a function of borehole depth. The clockwise interval between write-in contact 24a and read-out contact 24b represents a "recorder depth shift," that is, an interval which the recording medium of recorder 26 must be adjusted, to have the recorded well logging measurements coincide with the true depth of investigating apparatus 11 in the borehole. Located a clockwise interval $2d_1$ around the periphery of rotating memory 24 is a read-out contact 24c, which supplies the read-out computed signal $C_{n-2}$ to the input of a high input impedance amplifier 28, whose output is connected through a resistor 28a to resistor 21. Amplifier 28 and resistor 28a comprise a second weighting function circuit 22c of weighted adding network 22, the circuit 22c having a weight of $$1-\frac{B}{A}$$

Located a clockwise interval $4d_1$ around the periphery of rotating memroy 24 from write-in contact 24a is another read-out contact 24d, which supplies the read-out computed signal $C_{n-4}$ to the input of a high input impedance amplifier 27, whose output is connected through a resistor 27a to resistor 21. Amplifier 27 and resistor 27a comprise a third weighting function circuit 22b of weighted adding network 22, the circuit 22b having a weight of B/A.

The resistances of resistors 20a, 27a and 28a are large relative to the resistance of resistor 21 so that the current outputs of the weighting function circuits 22a, 22b and 22c will add across resistor 21 to develop a voltage across resistor 21 proportional to the applied input voltages, after weighting. It is the combination of the gains of the amplifiers 20, 27 and 28 and resistances of resistors 20a, 27a and 28a that determines the relative weights of each of the weighting function circuits. For purposes of illustration, the rotating memories 16 and 24 are assumed to be capacitor memories, in which case the write amplifiers are assumed to have low output impedances for quick charge and discharge of the capacitors, and the read-out amplifiers are assumed to have high input impedances so as to not disturb the charge on the capacitors for further read out.

Before proceeding with the operation of the apparatus of FIGURE 1, it would be desirable to look at the V.G.F. of the downhole investigating apparatus to see how the FIGURE 1 apparatus provides a computed signal which is indicative of a characteristic of the adjoining earth formations, as if investigated by apparatus having greatly improved vertical resolution. Looking at FIGURE 2a, there is represented diagrammatically a plurality of earth formation slabs $n$, $n-1$, $n-2$, $n-3$, $n-4$, and $n-5$, where $n$ is uphole. Adjacent the earth formation slabs, there is shown the V.G.F. $G_1$ of FIGURE 1 (solid line) which is opposite the earth formation slabs $n$ through $n-3$. The V.G.F. $G_1$ is broken down into two components, one with an area A which is opposite earth slabs $n$ and $n-1$ and a second component with a smaller area B which is opposite earth formation slabs $n-2$ and $n-3$. There is also shown this V.G.F. when it was opposite earth formation slabs $n-1$ through $n-4$, a distance $d_1$ in the downhole direction from the V.G.F. $G_1$. This is shown as the dotted line V.G.F. $G_1'$.

It may be desirable at this point to further explain what a V.G.F. is. As stated earlier, it can be defined as the relative response of the investigating apparatus to a thin conductive bed extending radially to infinity with non-conductive beds on either side thereof, as the investigating apparatus moves through the borehole. The resulting V.G.F. plot gives the relative response of the investigating apparatus to the adjoining earth formations. Taking the V.G.F. of FIGURE 2a as an example, if the investigating apparatus, and thus the V.G.F. $G_1$, is opposite an earth slab of conductivity $\sigma$, and of vertical thickness greater than the overall vertical (horizontal on the paper) length of $G_1$, the total derived signal will be $A\sigma+B\sigma$. Since $$\int_{-\infty}^{+\infty} Xdz$$

Figure 2A:
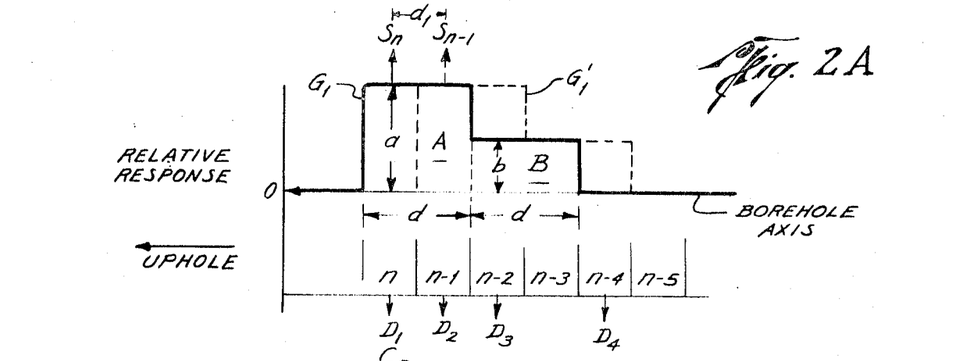
FIGURES 2a, 2b and 2c represent, graphically, certain vertical geometrical factors helpful in explaining how the apparatus of FIGURE 1 processes the well logging signals to obtain improved measurements.

(i.e., the area under the V.G.F. curve) is normalized to one, $A+B=1$. Thus, $A\sigma+B\sigma$ is equal to $\sigma$, which is the desired result. On the other hand, if an earth slab of conductivity $\sigma$ but of lesser thickness is opposite the A portion of V.G.F. $G_1$ for a depth interval of $\frac{1}{2}d$ only, then the derived signal resulting from this slab will be $$\frac{A}{2}\sigma$$

The V.G.F. of any given investigating apparatus moves along with the investigating apparatus as it moves through the borehole. A suitable point on the V.G.F. curve is picked as the measurement center point or recording point, i.e., the signal derived when the V.G.F. is located at a certain position in the borehole is deemed to be the well logging measurement as the center or recording point. This center or recording point is usually selected by integrating the V.G.F. curve and selecting the point where the integrated value on either side of the point is one-half of the total integrated value. However, for reasons to be explained later, the V.G.F. $G_1$ of FIGURE 2a is instead deemed to have its center or recording point at a point which is a distance $d/4$ from the uphole side of V.G.F. $G_1$.

The signal derived by the investigating apparatus when it is in the position designated by V.G.F. $G_1$ in FIGURE 2a (depth level $D_1$ in FIGURE 1) is designated $S_n$, and is deemed to be the derived well logging signal for the $n$th earth formation slab. In the same fashion, the signal derived by the investigating apparatus when it is in the position designated by V.G.F. $G_1'$ is deemed to be the signal $S_{n-1}$ derived at the $n-1$th earth slab (depth level $D_2$ in FIGURE 1). These are designated by the arrows $S_n$ and $S_{n-1}$ (FIGURE 2a), i.e., the arrow $S_n$ designated the recording point for the V.G.F. $G_1$ and the arrow $S_{n-1}$ designates the recording point for the V.G.F. $G_1'$. For purposes of nomenclature, the subscript "$n$" refers to the signals corresponding to the present depth level of the investigating apparatus.

The equations for the derived signals $S_n$ and $S_{n-1}$, where conductivity is the investigated characteristic, can be written as:

$$S_n = \frac{A}{2}\sigma_n + \frac{A}{2}\sigma_{n-1} + \frac{B}{2}\sigma_{n-2} + \frac{B}{2}\sigma_{n-3} \quad (1)$$

$$S_{n-1} = \frac{A}{2}\sigma_{n-1} + \frac{A}{2}\sigma_{n-2} + \frac{B}{2}\sigma_{n-3} + \frac{B}{2}\sigma_{n-4} \quad (2)$$

where $\sigma_n$, $\sigma_{n-1}$, etc. represent the conductivities of the $n$, $n-1$, etc. earth slabs respectively. Solving for the conductivity $\sigma_n$ of the $n$th earth slab from Equation 1.

$$\sigma_n = \frac{2}{A} S_n - \sigma_{n-1} - \frac{B}{A}(\sigma_{n-2} + \sigma_{n-3}) \quad (3)$$

In like fashion, solving for the conductivity $\sigma_{n-1}$ of the $n-1$ earth slab from Equation 2:

$$\sigma_{n-1} = \frac{2}{A} S_{n-1} - \sigma_{n-2} - \frac{B}{A}(\sigma_{n-3} + \sigma_{n-4}) \quad (4)$$

However, it can be seen from Equations 3 and 4 that the conductivities of the various earth formation slabs are not known and must be computed. By substituting the computed signals $C_n$, $C_{n-1}$, etc. for the conductivities $\sigma_n$, $\sigma_{n-1}$, etc., the following relationships can be written:

$$C_n = \frac{2}{A} S_n - C_{n-1} - \frac{B}{A}(C_{n-2} + C_{n-3}) \quad (5)$$

and $$C_{n-1} = \frac{2}{A} S_{n-1} - C_{n-2} - \frac{B}{A}(C_{n-3} + C_{n-4}) \quad (6)$$

Now, substituting Equation 6 into the value $C_{n-1}$ of Equation 5, the computed value $C_n$ is equal to:

$$C_n = \frac{2}{A}(S_n - S_{n-1}) + \left(1 - \frac{B}{A}\right) C_{n-2} + \frac{B}{A} C_{n-4} \quad (7)$$

In the same fashion, the equations for $C_{n-1}$, $C_{n-2}$, etc. could be derived. Thus, $$C_{n-1} = \frac{2}{A}(S_{n-1} - S_{n-2}) + \left(1 - \frac{B}{A}\right) C_{n-3} + \frac{B}{A} C_{n-5} \quad (8)$$

Figures 2B, 2C:
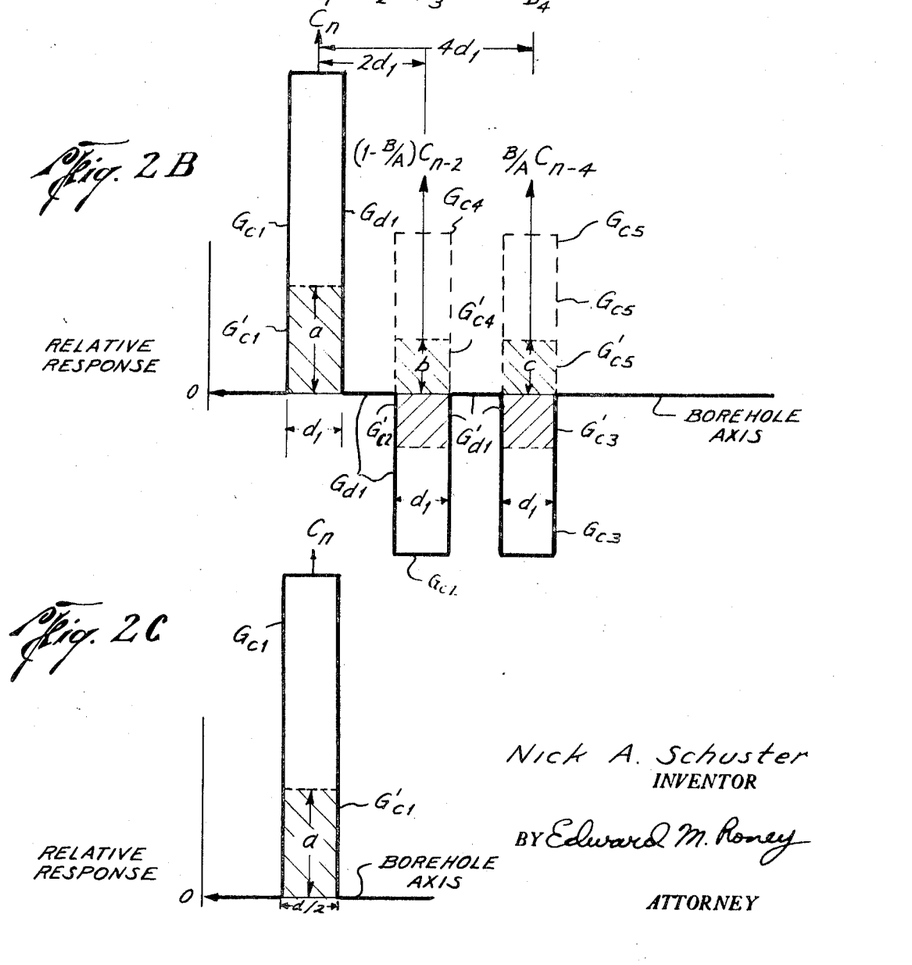

Looking now at FIGURE 2b, there is shown the V.G.F. $G_{d1}$ resulting from the subtraction of $G_1'$ from $G_1$, and subsequent weighting, corresponding to the signal subtraction of $S_{n-1}$ from $S_n$ and weighting in weighting function circuit 22a, which is represented by the solid line V.G.F. in FIGURE 2b. This corresponds to the first term of Equation 7, $$\frac{2}{A}(S_n - S_{n-1})$$

For the present, disregard the hatched portions of FIGURE 2b bounded by the dash-dot lines. Also, FIGURES 2a, 2b and 2c are lined up vertically on the paper (not the borehole axis), as are all of the V.G.F. plots in this application. That is, the difference V.G.F. $G_{d1}$ of FIGURE 2b is plotted directly under FIGURE 2a.

It can be seen that there is a first positive component $G_{c1}$ and two negative components designated $G_{c2}$ and $G_{c3}$. The dotted line components $G_{c4}$ and $G_{c5}$ of FIGURE 2b represent the V.G.F. components corresponding to the second and third terms of Equation 7 respectively, which are added to the resulting subtracted or difference V.G.F. $G_{d1}$, corresponding to the signal $S_n - S_{n-1}$, to cancel out the negative portions $G_{c2}$ and $G_{c3}$. These V.G.F. components $G_{c4}$ and $G_{c5}$ correspond to the weighted read-out computed signals $C_{n-2}$ and $C_{n-4}$ and are located distances of $2d_1$ and $4d_1$ respectively from the arrow $S_n$ in the downhole direction. After weighting, these two signals are $$\left(1 - \frac{B}{A}\right) C_{n-2}$$

and $$\frac{B}{A} C_{n-4}$$

respectively. The resulting computed V.G.F. is shown in FIGURE 2c. This represents the resulting computed V.G.F. after performing the operation represented by Equation 7 and FIGURES 2a and 2b.

Now, concerning what these "added in" V.G.F. components $G_{c4}$ and $G_{c5}$ represent, it can be seen from FIGURE 2b that the vertical or borehole axis interval (horizontal on the drawing) of each of the V.G.F. components $G_{c1}$, $G_{c2}$ and $G_{c3}$ is equal to $d_1$ ($d_1 = \frac{1}{2}d$). Also, the shape, though not amplitude, of these V.G.F. components are the same. It can thus be seen that computed signals corresponding to computed V.G.F.'s from downhole depth levels are combined with the difference signal $S_n - S_{n-1}$ corresponding to the difference V.G.F. $G_{d1}$ to provide the new computed signal $C_n$ corresponding to the computed V.G.F. of FIGURE 2c.

Referring again to FIGURE 1 in conjunction with FIGURES 2a, 2b and 2c for the purpose of explaining how the FIGURE 1 apparatus performs the operation depicted in FIGURES 2a, 2b and 2c, the output signal $S_n$ from amplifier 14 is stored in rotating memory 16 for an interval of time equal to the time for the downhole investigating apparatus to travel the distance $d_1$ between two successive earth formation slabs (e.g. $n-1$ to $n$) and then read out at read-out point 16b. The signal applied to the positive input of differential amplifier 19 comprises the derived well logging signal $S_n$ being presently derived, and the signal $S_{n-1}$ applied to the negative input of differential amplifier 19 is the derived well logging signal from the preceding earth formation slab (depth level $d_2$). This corresponds to the V.G.F. $G_1$ and $G_1'$ in FIGURE 2a. The difference signal from the output of differential amplifier 19 after weighting, corresponds to the solid line V.G.F. of FIGURE 2b, that is, the output signal from differential amplifier 19 corresponds to a downhole investigating apparatus which has a V.G.F. $G_{d1}$ in FIGURES 2b.

The output from weighted adding circuit 22 represents the computed signal $C_n$, corresponding to the V.G.F. $G_{c1}$ of FIGURE 2c, which is written into the memory 24 at write-in contact 24a. Since rotating memory 24 is driven in accordance with the depth of the downhole investigating apparatus in the borehole, the signal $C_{n-2}$ at read-out contact 24c is the computed signal which was stored when the downhole investigating apparatus 11 was at depth level $d_3$, a distance $2d_1$ from the depth level $d_1$ where the center or recording point of the downhole investigating apparatus is presently situated. This corresponds to the V.G.F. $G_{c4}$ in FIGURE 2b and represents the computed value of conductivity of the n-2 earth slab. In like fashion, the read-out signal $C_{n-4}$ from read-out point 24d an interval $4d_1$ from write-in contact 24a is the computed value of conductivity of the n-4 earth slab of FIGURE 2a when the apparatus 11 was at depth level $d_4$, and after weighting, corresponds to the V.G.F. $G_{c5}$ of FIGURE 2b. These computed values $C_{n-2}$ and $C_{n-4}$ are combined in weighted adding circuit 22 along with the difference signal $S_n - S_{n-1}$ from differential amplifier 19 to provide the new computed signal $C_n$ in accordance with Equation 7. It can be seen that this computed signal $C_n$ which is written into memory 24 at write-in contact 24a becomes $C_{n-2}$ after the downhole investigating apparatus has traveled up the hole by a depth interval of $2d_1$. In like fashion, the initial write-in computed value $C_n$ becomes $C_{n-4}$ at read-out contact 24d after the downhole investigating apparatus has traveled up by a depth interval $4d_1$. Thus, it can be seen how the stored computed signals $C_{n-2}$ and $C_{n-4}$ from prior depth levels are utilized to cancel out undesired component V.G.F.'s $G_{c2}$ and $G_{c3}$ of the difference V.G.F. $G_{d1}$.

The computed signal $C_n$ is read out of rotating memory 24 at read-out contact 24b for the purpose of enabling recorder 26 to provide a log of the conductivity of the adjoining earth formations as a function of depth. This log produced by recorder 26 corresponds to the log that would be obtained by a downhole investigating apparatus having a V.G.F. corresponding to the V.G.F. $G_{c1}$ of FIGURE 2c. Thus, it can be seen that the signal processing apparatus of FIGURE 1 provides a much sharper log of the investigated characteristic of the adjoining earth formations, that is, a log which will be responsive to a much narrower vertical (borehole axis) region of the surrounding earth formations than the original apparatus V.G.F. $G_1$. It is to be understood that the sharpness of the final computed V.G.F. $G_{c1}$ can be varied by varying the interval $d_1$ between the V.G.F.'s $G_1$ and $G_1'$ of FIGURE 2a. In other words, this can be accomplished by varying the interval $d_1$ between the write-in contact 16a and read-out contact 16b of memory 16, which may also necessitate changing the read-out position 24c and 24d of memory 24. Looking at FIGURE 2a, it can be seen that if the interval $d_1$ is decreased, the V.G.F.'s $G_1$ and $G_1'$ will become closer together, thus causing the final computed V.G.F. $G_{c1}$ to have a much narrower vertical extent and, thus much better vertical resolution.

There still remains the matter of starting the signal processing operation of FIGURE 1 when the downhole investigating apparatus 11 is at the bottom of the borehole. To initiate the signal processing operation, the downhole investigating apparatus 11 is held stationary at the bottom of the borehole while supplying the derived signal $S_n$ to the surface of the earth. At the same time, shaft 17c to differential gear 14a is rotated by hand, thus causing memories 16 and 24 to rotate. At the same time, switch 23a is placed in the position to connect amplifier 14 directly to write-in contact 24a of rotating memory 24 and switch 25a is opened. The derived signal $S_n$ is, therefore, written into memories 16 and 24 as they are rotated. This operation is performed until $S_n$ is stored in all positions of memories 16 and 24. Now, to initiate the logging operation, switch 23a is positioned to connect amplifier 23 to write-in contact 24a of memory 24, switch 25a is closed, shaft 17c is no longer rotated, and the downhole investigating apparatus 11 is raised through the borehole 12. The operation then proceeds as previously discussed.

In connection with initiating the signal processing operation at the bottom of the borehole, if the earth formations at the bottom of the borehole are not homogeneous, an error may result in the initially stored measurements. It can be shown, however, that for many V.G.F. shapes, this error will be rapidly eliminated as the investigating apparatus 11 moves away from the bottom of the borehole. If, however, this procedure does not produce entirely satisfactory results, then, for logging apparatus having a symmetrical type V.G.F., the logging operation can be initiated at a point near the bottom of the borehole where the formations are relatively homogeneous for a sufficient distance to allow the memories to store accurate values. Then, the interval from this relatively homogeneous region to the bottom of the borehole can be logged. Then, the downhole investigating apparatus would be returned to that relatively homogeneous region and the remainder of the borehole logged.

Before proceeding with other embodiments of the present invention, it would be desirable at this time to set forth some general rules on how to determine the read-out positions from the memories and the weights of the weighting function circuits for any V.G.F. The teachings of the present invention can be applied to many other V.G.F.'s and the mathematical expression derived in the same manner as Equation 7 above. However, the same mathematical operation can be carried out graphically also.

Now, looking at FIGURES 2a, 2b and 2c for this graphical operation, the first step is to graphically show the original investigating apparatus V.G.F. in two positions corresponding to two different depth levels in the borehole (e.g., $G_1$ and $G_1'$ in FIGURE 2a). Next, graphically subtract one V.G.F. from the other (preferably, the downhole V.G.F. from the uphole V.G.F., i.e., $G_1'$ from $G_1$, since logs are normally made while moving up the hole) and plot the resulting difference V.G.F. directly under the subtracted V.G.F.'s. This unweighted or unnormalized difference V.G.F., designated $G_{d1}'$, is represented in FIGURE 2b as the dash-dot lines bordering the hatched areas together with intermediate solid line segments lying on the zero axis for the relative response. This difference V.G.F. should have a plurality of component parts having substantially similar shapes (but not amplitudes), e.g. the component V.G.F.'s $G_{c1}'$, $G_{c2}'$ and $G_{c3}'$ in FIGURE 2b. If these component parts do not have substantially similar shapes, then the interval between the two original V.G.F.'s can be varied until the component V.G.F.'s have the desired shapes, e.g. the interval $d_1$ between the arrows $S_n$ and $S_{n-1}$ in FIGURE 2a. Alternatively, the shape of the original apparatus V.G.F. could be varied by varying the transducer configuration. It is to be understood that, in practice, the shapes of the component V.G.F.'s of the difference V.G.F. may sometimes be slightly dissimilar, thus causing the final computed V.G.F. to have some undesirable fluctuations, but nonetheless, the resulting computed V.G.F. will be substantially improved.

Next, the center or recording point for the final unnormalized computed V.G.F. ($G_{c1}'$ in FIGURE 2b) is determined. (In the preferable manner, this point is determined by selecting the point on the final unnormalized computed V.G.F. where the areas on both sides are equal, e.g. in $G_{c1}'$ of FIGURE 2b, the center of $G_{c1}'$ where the arrow $C_n$ is located). Now, remembering that the difference V.G.F. plot is lined up directly under the subtracted V.G.F.'s (e.g. FIGURE 2b is lined up directly under FIGURE 2a), then, the center or recording point for the final unnormalized computed V.G.F. (e.g. $G_{c1}'$ in FIGURE 2b) is projected up to the V.G.F. corresponding to the presently derived signal $S_n$ (e.g. $G_1$ corresponding to $S_n$ in FIGURE 2a). This projected point determines the relative location of the center or recording point of the original investigating apparatus V.G.F. and, by comparison, the recording point of the shifted V.G.F. (e.g. the arrows $S_n$ and $S_{n-1}$ on V.G.F.'s $G_1$ and $G_1'$. This original apparatus V.G.F. center point determines the point on the downhole investigating apparatus which gives the depth level for the computed signal resulting from the well logging signal derived at that depth level. In FIGURE 1, it is shown by the letter "O." Next, V.G.F.'s having the same shape and vertical (borehole axis) extent as the final computed V.G.F. are placed at the desired points on the unnormalized difference V.G.F. plot, and with the desired magnitudes to substantially cancel out the undesired V.G.F. components of the unnormalized difference V.G.F. $G_{d1}'$ (e.g. $G_{c4}'$ and $G_{c5}'$ have the same shape but different magnitudes and polarity from $G_{c1}'$, to cancel out $G_{c2}'$ and $G_{c3}'$ in FIGURE 2b). The center or recording points of the component V.G.F.'s which are combined with the difference V.G.F. are located at the same point on these component V.G.F.'s as on the final computed V.G.F. (e.g. the arrows $C_{n-2}$ and $C_{n-4}$ are at the same points relative to component V.G.F.'s $G_{c4}'$ and $G_{c5}'$ (the midpoints thereof) as the arrow $C_n$ is relative to the final unnormalized V.G.F. $G_{c1}$ (the midpoint thereof). These points represented by arrows $S_n$, $S_{n-1}$, $C_{n-2}$, $C_{n-4}$ in FIGURE 2, are the computing stations. There is a signal supplied to the combining circuits (differential amplifier 19 and weighted adding network 22) for every computing station.

Now, to determine the distances between write-in and read-out points on the memories, the intervals between computing stations is utilized. The intervals between the original apparatus V.G.F. located at the two depth levels determines the interval between the write-in and read-out points of the memory which stores the raw derived signals (e.g. the interval $d_1$ in FIGURE 2a and the memory 16 of FIGURE 1). The intervals between the write-in and read-out points of the memory which stores the computed signals are determined by the intervals between the center or recording point of the final unnormalized computed V.G.F. and the center points of each of the component V.G.F.'s which are combined with the difference V.G.F. (e.g. the interval $2d_1$ and $4d_1$ between the arrows $C_n$ and $C_{n-2}$, and $C_n$ and $C_{n-4}$ respectively of FIGURE 2b and the intervals $2d_1$ and $4d_1$ of memory 24 to FIGURE 1).

To determine the relative weights of the weighting function circuits, the amplitudes or heights of the final unnormalized computed V.G.F. at its recording point, and the heights at the center or recording points of the unnormalized component V.G.F.'s used to cancel out the undesired component V.G.F.'s of the difference V.G.F. are used. (e.g. The heights $a$, $b$ and $c$ of unnormalized component V.G.F.'s $G'_{c1}$, $G'_{c4}$ and $G'_{c5}$ in FIGURE 2b). The relative weights of each of the unnormalized component V.G.F.'s which are combined with the unnormalized difference V.G.F. will be the ratio of the heights of each of these unnormalized component V.G.F.'s to the height of the final computed V.G.F. (e.g. in FIGURE 2b, $b/a$ and $c/a$ will be the relative weights applied to unnormalized component V.G.F.'s $G'_{c4}$ and $G'_{c5}$). The relative weight applied to the difference V.G.F. will be "1." The weights established by this method are relative weights, not normalized weights, and will provide a computed signal $C_n$ which is proportional to the measured characteristic.

For normalization, the area of the final computed V.G.F. must equal the area of the original apparatus V.G.F. provided this original V.G.F. is already normalized. (e.g. For normalization, the area of $G'_{c1}$ must be multiplied by a "normalization factor" to be made equal to the area of $G_1$ provided $A+B=1$ in FIGURES 2a and 2b) To accomplish this, the weight of the unnormalized difference V.G.F. (e.g. in FIGURE 2b, $G'_{d1}$ is changed.

Taking an example of this normalization procedure in connection with FIGURES 2a, 2b and 2c, the area of the original apparatus V.G.F. is $a \cdot d + a \cdot d$ where $a$ and $b$ are the heights of portions A and B of V.G.F. $G_1$ respectively and $d$ is the vertical extent of each portion A and B. (Note: In the FIGURE 2 case, the heights $a$ and $b$ of FIGURE 2a are equal to the heights $a$ and $b$ of FIGURE 2b, and thus have the same designations, but for other V.G.F.'s, this may not be true). The area of V.G.F. component $G'_{c1}$ is $a \cdot d/2$ where $d/2$ is the vertical extent thereof. Now setting $a=2b$ for the case of the present example, the total area of $G_1$ is $$a \cdot d + \frac{a}{2} d = \frac{3}{2} a \cdot d$$

Thus, for the area of the final computed V.G.F. to equal the area of the original apparatus V.G.F., the height of the unnormalized final computed V.G.F. must be multiplied by 3. This gives the normalized V.G.F. $G_{c1}$ of FIGURES 2b and 2c. To accomplish this, as stated earlier, the unnormalized difference V.G.F. $G'_{d1}$ is multiplied by 3, this being accomplished by the weighting function circuit 22a. This results in the V.G.F. $G_{d1}$ of FIGURE 2b, whose component V.G.F. $G_{c1}$ is now 3 times larger in magnitude than $G'_{c1}$.

Now, since the height of $G'_{c1}$ is twice the height of $G'_{c4}$ and $G'_{c5}$ the weights applied to the read-out computed signals $C_{n-2}$ and $C_{n-4}$ are both ½. Thus, the normalized component V.G.F.'s $G_{c4}$ and $G_{c5}$ will have heights one-half as great as the height of $G_{c1}$, thus cancelling out the undesired V.G.F. components $G_{c2}$ and $G_{c3}$ of the normalized difference V.G.F.$_{d1}$ and leaving $G_{c1}$ as the final computed V.G.F.

It can be shown that this above graphical procedure agrees with the mathematical derivation of Equation 7 by substituting the exampled values into Equation 7. Since $A+B=1$ and $A=2b$ in the above example (i.e. $a \cdot d = 2b \cdot d$), $A=2/3$ and $B=1/3$. Substituting these values for A and B into Equation 7, we have:

$$C_n = \frac{2}{2/3}(S_n - S_{n-1}) + \left(1 - \frac{1/3}{2/3}\right)C_{n-2} + \frac{1/3}{2/3}C_{n-4} = $$
$$3(S_n - S_{n-1}) + \tfrac{1}{2}C_{n-2} + \tfrac{1}{2}C_{n-4} \quad (9)$$

It can be seen that the weights in Equation 9 coincide with the weights established by the above graphical procedure.

In the present embodiment, these weights (i.e. 3, ½ and ½) are applied by the respective weighting function circuits 22a, 22b and 22c.

The same result can be accomplished if the weighting function circuit 22a is instead constructed to apply a weighting factor of unity and the normalization factor or multiplier (3 in the present example) is applied at some later point in the system such as, for example, in the read-out amplifier 25 or in the recorder 26. In this event, the component terms $(S_n - S_{n-1})$, $C_{n-2}$ and $C_{n-4}$, as applied to the common summing point (top of resistor 21) would also be one-third of the normalized values. Their relative weights (i.e. 1, ½, and ½) would, however, be the correct values to produce the desired cancellation as shown by the unnormalized V.G.F.'s in FIGURE 2b.

Figure 3A:
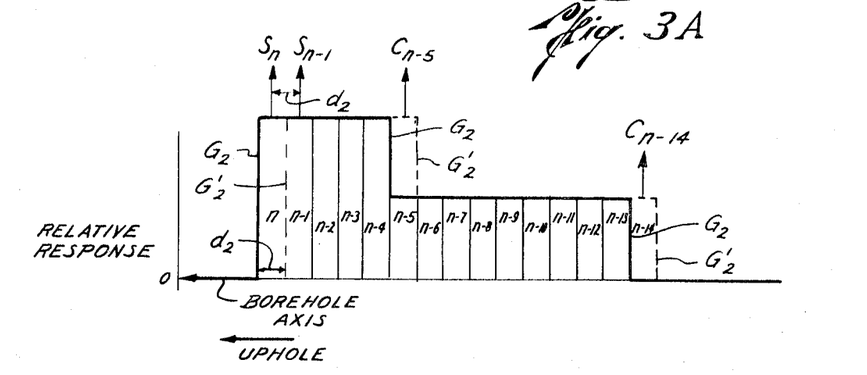
FIGURES 3a, 3b and 3c represent, graphically, other vertical geometrical factors useful in understanding another embodiment of the present invention.
Figure 3B:
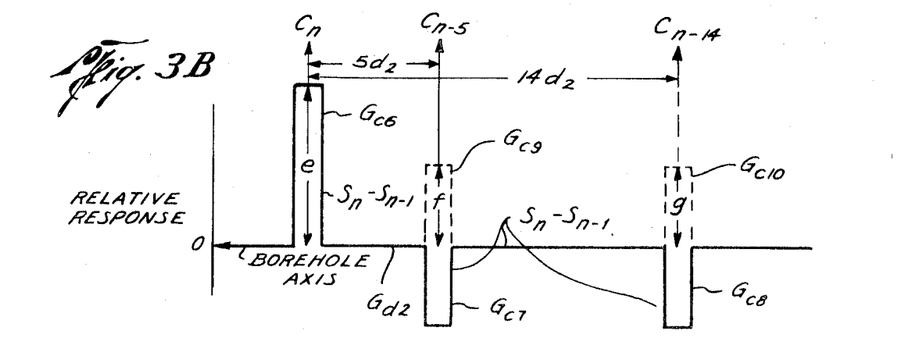
Figure 3C:
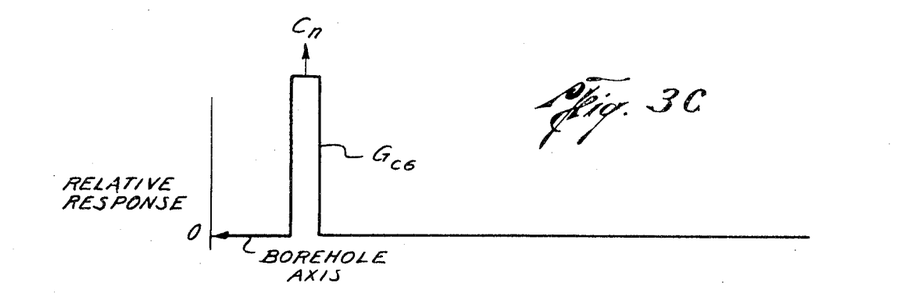

Looking now at FIGURE 3a, there is shown another V.G.F. located in two different depth positions. The solid line plot $G_2$ represents the V.G.F. at one depth level and the dotted line plot $G'_2$ represents the V.G.F. shifted an interval $d_2$ in the downhole direction from $G_2$. The V.G.F.'s is $G_2$ and $G'_2$ are subdivided into a plurality of hypothetical slabs designated $n$ through $n-14$, each slab having a vertical borehole thickness of $d_2$. Now, in accordance with the graphical technique discussed above, the V.G.F. $G'_2$ is subtracted from V.G.F. $G_2$. Looking now at FIGURE 3b (positioned directly under FIGURE 3a on the paper), there is shown the difference V.G.F. $G_{d2}$ which results from the substraction of $G'_2$ from $G_2$. This difference V.G.F. $G_{d2}$ has three component V.G.F. $G_{c6}$, $G_{c7}$ and $G_{c8}$ (the solid line rectangles), all of the components having the same shape and vertical extent. Next, the V.G.F. components $G_{c9}$ and $G_{c10}$, having the same shape and vertical extent as the component V.G.F.'s $G_{c6}$, $G_{c7}$ and $G_{c8}$, are placed at the desired vertical positions to cancel out the undesired V.G.F. components $G_{c7}$ and $G_{c8}$ to leave the V.G.F. component $G_{c6}$ as the final computed V.G.F., as shown in FIURE 3c. In FIGURES 3a, 3b, 3c and the remainder of FIGURES showing V.G.F.'s, only the unnormalized V.G.F.'s are shown for brevity, although it is to be understood that the normalized V.G.F.'s could be plotted in the same manner as in FIGURES 2a, 2b and 2c.

Now, the center or recording point of the final computed V.G.F. is determined as the center or computed V.G.F. $G_{c6}$, represented by the arrow $C_n$. This point is then projected up to FIGURE 3a to determine the center or recording point of the original apparatus V.G.F. $G_2$, which is represented by the arrow $S_n$. A corresponding vertical (borehole axis) point on V.G.F. $G_2'$ is designated by the arrow $S_{n-1}$. The interval $d_2$ between the arrows $S_n$ and $S_{n-1}$ represents the interval which the derived signal $S_n$ must be stored before being read out as $S_{n-1}$ to be subtracted from the new derived signal $S_n$. The center or recording points of the component V.G.F.'s $G_{c9}$ and $G_{c10}$, which are likewise in the center of each component V.G.F., are located intervals of $5d_2$ and $14d_2$ respectively from the arrow $S_n$ or $C_n$, and are designated by the arrows $C_{n-5}$ and $C_{n-14}$ respectively. Thus, the read-out computed signals $C_{n-5}$ and $C_{n-14}$, corresponding to V.G.F. components $G_{c9}$ and $G_{c10}$, represent the computed signal $C_n$ stored intervals of $5d_2$ and $14d_2$ prior to deriving the new signal $S_n$.

Now, to determine the weights of the weighting function circuits in accordance with the above graphical procedure, the heights $e$, $f$, and $g$ of component V.G.F.'s $G_{c6}$, $G_{c9}$ and $G_{c10}$ are utilized. In accordance with the above procedure, the unnormalized or relative weights to be applied to $(S_n - S_{n-1})$, $C_{n-5}$ and $C_{n-14}$ are 1 ($e$ is set equal to 1), $f/e$ and $g/e$ respectively. For normalization, the weight for $(S_n - S_{n-1})$ (or read-out amplification or scale change) is boosted by the ratio X of the area of the original V.G.F. $G_2$ to the final computed V.G.F. $G_{c6}$. Taking a numerical example, if the trailing edge of original V.G.F. $G_1$ is ½ the height of the leading edge, $f/e$ and $g/e$ will each be ½. The ratio of $G_2$ to $G_{c6}$ will be 9.5.

The general normalized equation for the operation depicted in FIGURES 3a, 3b and 3c will then be:

$$C_n = X \cdot (S_n - S_{n-1}) + \frac{f}{e} C_{n-5} + \frac{g}{e} C_{n-14} \quad (10)$$

Substituting the numerical example above into Equation (10), we have:

$$C_n = 9.5(S_n - S_{n-1}) + \frac{1}{2} C_{n-5} + \frac{1}{2} C_{n-14} \quad (11)$$

Concerning the apparatus that could be utilized to perform the operation depicted in FIGURES 3a, 3b, to produce the computed V.G.F. of FIGURE 3c, the FIGURE 1 apparatus could be slightly modified to perform this operation. In FIGURE 1, the clockwise intervals between write-in contact 16a and read-out contact 16b of memory 16 would be $d_2$ instead of $d_1$ corresponding to the $d_2$ of FIGURE 3a. Likewise, the clockwise interval between write-in contact 24a and read-out contacts 24c and 24d would be $5d_2$ and $14d_2$ respectively instead of $2d_1$ and $4d_1$, corresponding to the depth intervals of $5d_2$ and $14d_2$ in FIGURE 3b. The weights of weighting function circuits 22a, 22c and 22b would be X, $f/e$ and $g/e$ respectively, or using the numerical examples, 9.5, ½, and ½ respectively. Other than these changes, the apparatus of FIGURE 1 remains the same and operates in the same manner and thus, need not be discussed further.

Figure 4:
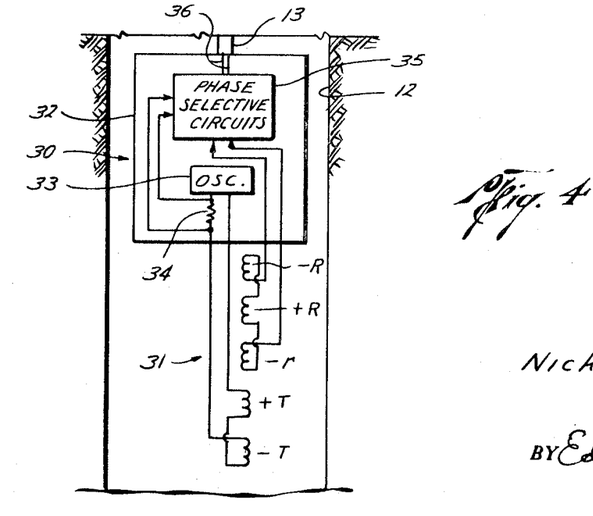
FIGURE 4 represents another embodiment of apparatus to be utilized in combination with the apparatus of FIGURE 1 for processing well logging measurements in accordance with the present invention wherein an "induction logging" apparatus is shown in a borehole for deriving the well logging measurements.

Looking now at FIGURE 4, there is shown a downhole investigating apparatus 30 of the "induction logging" type including a coil array 31, lowered into a borehole 12 on the end of a cable 13 that could be utilized with the signal processing apparatus of FIGURE 1. This coil array is disposed on a central support member (not shown) which, in turn, is connected to a pressure-tight housing 32 containing the downhole electrical circuitry. The coil array includes from top to bottom, a negative polarity receiver coil (focusing coil) —R, a main receiver coil +R, a negative bucking or focusing receiver coil having a few turns —r, a main transmitter coil +T, and a negative focusing transmitter coil —T. The turns and spacings of these coils can be determined in accordance with standard induction logging coil design procedure. It is to be understood that this particular coil configuration is exemplary and any array could be utilized.

Within the pressure-tight housing 32, an oscillator 33 supplies current through a low resistance resistor 34 to the transmitter coils. The transmitting coils induce a secondary voltage in the adjacent earth formations, which sets up a secondary current flow, which secondary current flow induces a voltage in the receiver coils. This induced voltage is proportional to the conductivity of the surrounding earth formations. This received voltage is applied to the input of phase-selective circuits 35, to which also is supplied the phase-reference signal developed across resistor 34 in the usual manner. The output from phase-selective circuits 35 is a varying DC signal proportional to the measured conductivity of the adjoining earth formations. This DC signal is supplied to the surface of the earth by way of a conductor pair 36 which is contained within the armored cable 13. Conductor pair 36 supplies the derived well logging signals to signal processing circuitry similar to that of FIGURE 1. The differences will be described later.

Figure 5A:
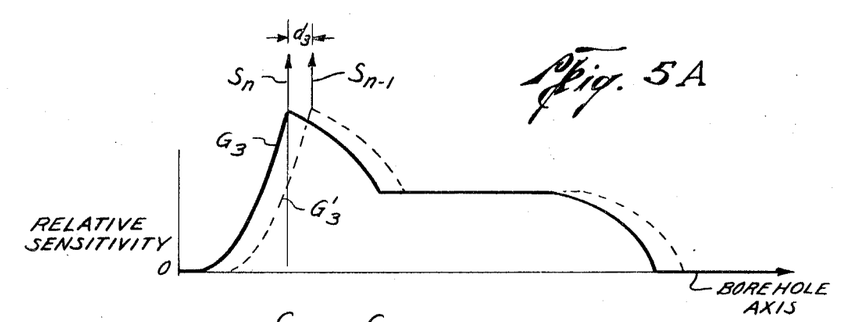
FIGURES 5a, 5b and 5c represent, graphically, how the vertical geometrical factor corresponding to the signals derived from the "induction logging" apparatus of FIGURE 4 is processed in accordance with the teachings of the present invention.

Now, referring to FIGURE 5a, there is shown the V.G.F. $G_3$ (solid line plot) of the particular coil array 31 shown in FIGURE 4. There is also shown the dotted line representation $G_3'$ of the V.G.F. $G_3$ shifted an interval $d_3$ downhole from the position of the V.G.F. $G_3$. Looking now at FIGURE 5b, there is shown the resulting difference V.G.F. $G_{d3}$ after subtracting V.G.F. $G_3'$ from V.G.F. $G_3$. This difference V.G.F. $G_{d3}$ is the solid line curve in FIGURE 5b, having component V.G.F.'s $G_{c11}$, $G_{c12}$ and $G_{c13}$. Assuming that the desired final computed V.G.F. is the component V.G.F. $G_{c11}$, it can be seen that the component V.G.F.'s $G_{c12}$ and $G_{c13}$ must be cancelled. The component V.G.F.'s $G_{c14}$ and $G_{c15}$ (dotted line curves) are utilized to cancel out these undesired V.G.F. components. As established earlier, the component V.G.F.'s which are used to subtract out the undesired V.G.F. components and must have the same shape and vertical extent as the final computed V.G.F. $G_{c11}$, though the amplitudes can be different so as to cancel out the undesired V.G.F. components of the difference V.G.F.

Figure 5B:
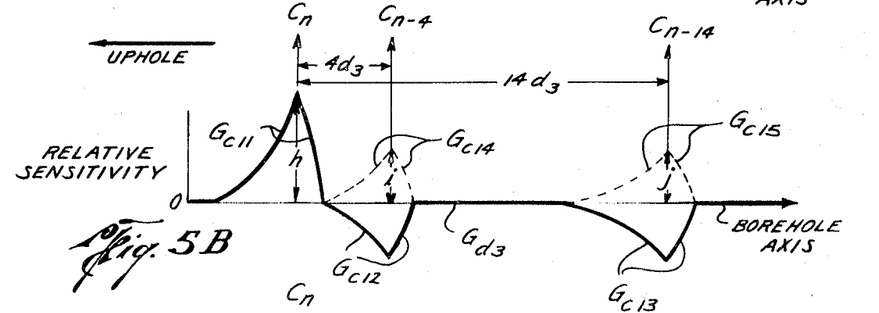
Figure 5C:
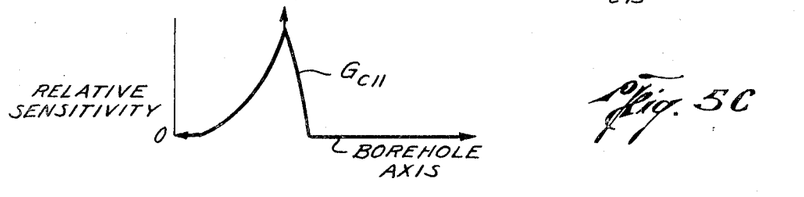

Now, to determine the intervals between read-in and read-out contacts of the memories in accordance with the previous graphical procedure, the recording point is first picked as the peak of the final computed V.G.F. component $G_{c11}$. Next, this point, designated by the arrow $C_n$ in FIGURES 5b and 5c, is projected upward to the original apparatus V.G.F. $G_3$, shown by the arrow $S_n$. By comparison, this also determines the recording point for the V.G.F. $G_3'$, shown as the arrow $S_{n-1}$. The interval between the arrows $S_n$ and $S_{n-1}$ is designated $d_3$. Since the peak of V.G.F. $G_{c11}$ is the recording point for the final computed V.G.F., the peaks of component V.G.F.'s $G_{c14}$ and $G_{c15}$ are the recording points for these V.G.F.'s, designated by the arrows $C_{n-4}$ and $C_{n-14}$. The distances between the peak points of V.G.F. components $G_{c11}$–$G_{c14}$ and $G_{c11}$–$G_{c15}$ are $4d_3$ and $14d_3$. In accordance with the previous graphical procedure for determining the weights of the weighting function circuits, the heights $h$, $i$, and $j$ of component V.G.F.'s $G_{c11}$, $G_{c14}$ and $G_{c15}$ at the peak or recording points are utilized. Setting $h=1$, $i/k$ and $j/k$ are the weights of weighting function circuits 53b and 53c respectively. The weight "Y" of weighting function circuit 53a is the ratio of the area of original apparatus V.G.F. $G_3$ to the area of the final computed V.G.F. $G_{c11}$, for normalization.

The signal processing apparatus for performing the operation depicted in FIGURES 5a–5c could take the same form as in FIGURE 1 with the exception that the distances between the write-in and rear-out contacts on the memories and the weights of the weighting function circuits would be different. That is, the clockwise intervals between the write-in and read-out contacts of memories 16 and 24 would be $d_3$, $4d_3$ and $14d_3$ corresponding to FIGURES 5a and 5b, instead of $d_1$, $2d_1$ and $4d_1$. Likewise, the weights of weighting function circuits 22a, 22c and 22b would be Y, $i/h$ and $j/h$ respectively. The remainder of the circuitry of FIGURE 1 would be as shown and would operate in the same manner. Additionally, a "skin effect" function forming circuit would be added prior to the recorder for providing electrical skin effect correction. This circuit could be constructed in accordance with teachings of U.S. Patent No. 3,226,633 granted to W. P. Schneider on Dec. 28, 1965.

Figure 6A:
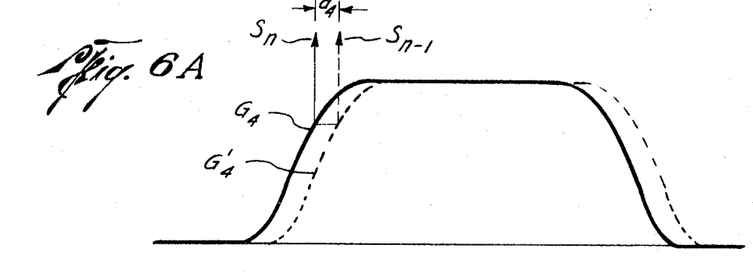
FIGURES 6a, 6b and 6c graphically represent other vertical geometrical factors useful in understanding another embodiment of the present invention.

Looking now at FIGURE 6a, there is shown another original apparatus V.G.F. $G_4$, which has an approximately rectangular shape with gradually sloping sides. This type of V.G.F. is frequently encountered in connection with various types of sonic logging and radioactivity logging investigating apparatus.

As in the preceding examples, the solid line V.G.F. curve $G_4$ corresponds to the downhole investigating apparatus at one depth in the borehole and the dotted line V.G.F. $G_4'$ corresponds to the downhole investigating apparatus at a preceding depth in the borehole. Utilizing the techniques set forth earlier, the dotted line V.G.F. $G_4'$ is subtracted from a solid line V.G.F. $G_4$ and the resulting difference V.G.F. $G_{d4}$ is shown as the solid line curve in FIGURE 6b. The difference V.G.F. $G_{d4}$ has component V.G.F.'s $G_{c16}$ and $G_{c17}$. Now, selecting component V.G.F. $G_{c16}$ as the final computed V.G.F., a component V.G.F. $G_{c18}$ having the same shape and vertical extent as the final computed V.G.F. $G_{c16}$ and the same magnitude as component V.G.F. $G_{c17}$ which is to be cancelled, is combined with the difference V.G.F. $G_{d4}$ to produce the new computed V.G.F. $G_{c16}$.

Figures 6B, 6C:
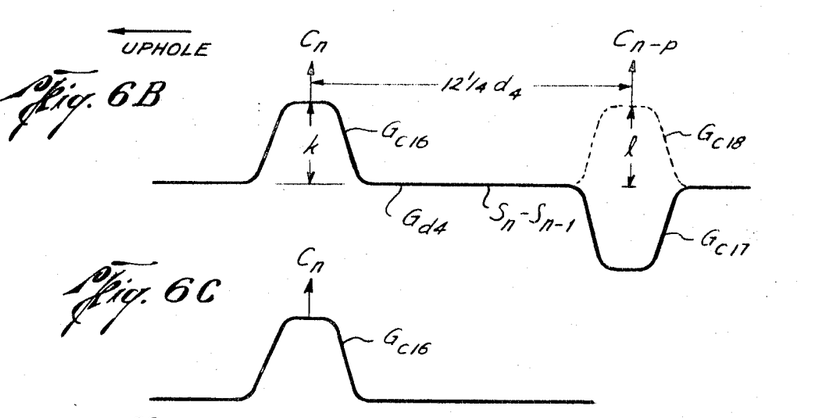

Now remembering that a suitable center or recording point must be first selected on this final computed V.G.F., the arrow $C_n$, designating the computed signal $C_n$, is positioned in the middle of the flat portion of the desired final computed V.G.F. $G_{c16}$. Now, projecting a line from this arrow $C_n$ to the original apparatus V.G.F. $G_4$ corresponding to the signal $S_n$ (FIGURES 6a, 6b and 6c are in vertical alignment on the drawing), the arrow $S_n$ can be drawn designating the recording point for V.G.F. $G_4$. Now picking the corresponding point on the V.G.F. $G_4'$, the arrow $S_{n-1}$ corresponding to the read-out derived signal $S_{n-1}$ can be drawn. The distance between the arrows $S_n$ and $S_{n-1}$ is designated $d_4$. The center point of V.G.F. component $G_{c18}$ is located in the center of the plateau region thereof, designated $C_{n-p}$, in a similar manner as for the recording point of final computed V.G.F. $G_{c16}$. The depth interval between the arrows $C_n$ or $S_n$ and $C_{n-p}$ is $12\frac{1}{4}d_4$.

To determine the weights of the weighting function circuits, the heights $k$ and $l$ of V.G.F. components $G_{c16}$ and $G_{c18}$ respectively are utilized. Setting $k=1$, the weight to be applied to the read-out computed signal $C_{n-p}$ is $l/k$. Now, to determine the normalized weight to be applied to the difference signal $S_n - S_{n-1}$, the ratio, designated Z, of the area of the original apparatus V.G.F. $G_4$ to the area of the final computed V.G.F. $G_{c16}$ is utilized as this weight.

Figure 7:
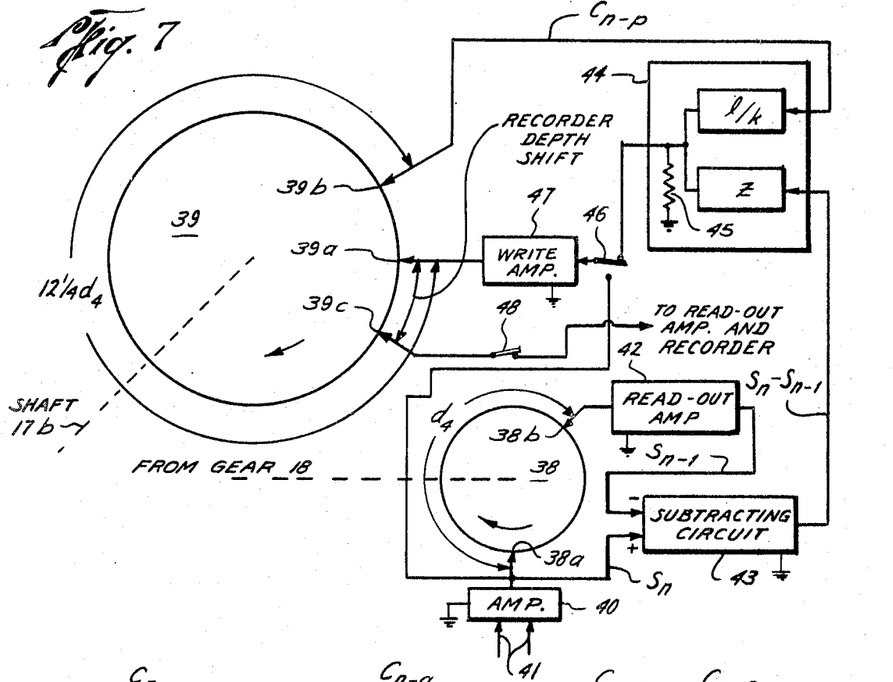
FIGURE 7 represents signal processing apparatus for performing the operation depicted in FIGURES 6a, 6b and 6c.

Now looking at FIGURE 7, there is shown apparatus for performing the operation depicted in FIGURES 6a, 6b and 6c. There are shown rotating memories 38 and 39 similar to the rotating memories 16 and 24 of FIGURE 1. Rotating memories 38 and 39 are driven from gear 18 and shaft 17b in the same manner as rotating memories 16 and 24 of FIGURE 1. Memory 38 has a write-in contact 38a to which is supplied the derived well logging signal $S_n$ from an amplifier 40 to which is supplied the derived signal $S_n$ via the conductor pair 41 from the downhole apparatus. A read-out contact 38b located the clockwise interval $d_4$ (see FIGURE 6a) from write-in contact 38a is supplied through a read-out amplifier 42 to the minus input of a subtracting circuit 43, the plus input being supplied from the output of amplifier 40. The output of subtracting circuit 43 is supplied to the Z weighting function circuit of a weighted adding network 44, whose output, taken across a low resistance resistor 45 is supplied to one contact of a double-throw switch 46. The common contact of switch 46 is supplied through a write amplifier 47 to a write-in contact 39a of memory 39. A read-out contact 39b thereof, located a clockwise interval $12\frac{1}{4}d_4$ from write-in contact 39a, is supplied to the $l/k$ weighting function circuit of weighted adding network 44. The read-out contact 39c for supplying the read-out computed signal $C_n$ to the recorder through a switch 48, is located a short clockwise interval from write-in contact 39a.

The apparatus of FIGURE 7 operates in substantially the same manner as the FIGURE 1 apparatus with the exception that the FIGURE 7 apparatus only combines one read-out computed signal with the difference signal $S_n - S_{n-1}$. More particularly, the derived signal $S_n$ is stored in memory 38 for a depth interval $d_4$, read out and subtracted from the new derived signal $S_n$ in subtracting circuit 43. The difference signal $S_n - S_{n-1}$, corresponding to the difference V.G.F. $G_{d4}$ of FIGURE 6b, is then combined with the read-out computed signal $C_{n-p}$ in weighted adding network 44 to produce the new computed signal $C_n$, corresponding to the computed V.G.F. $G_{c16}$ of FIGURES 6b and 6c, which is written into memory 39 for later read out. The FIGURE 7 apparatus can be "started" at the bottom of the borehole in the same manner as the FIGUURE 1 apparatus.

Figure 8:
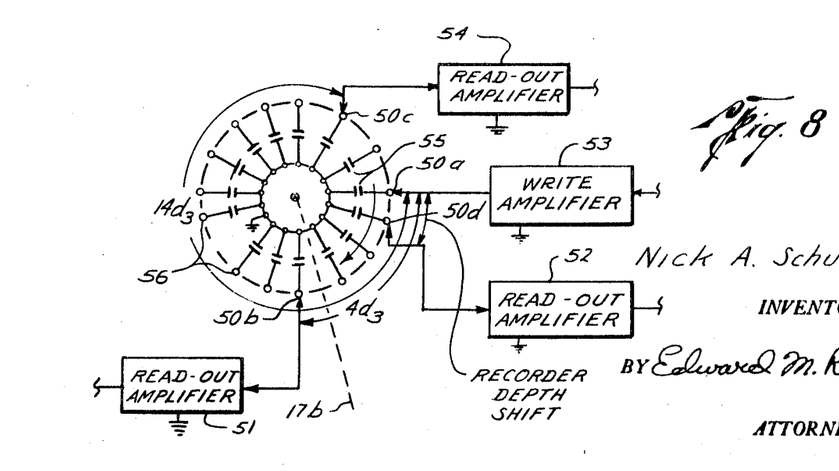
FIGURE 8 represents a typical memory device and associated circuitry that could be utilized with the present invention.

Looking now at FIGURE 8, there is shown a typical memory device 50 with associated write-in and read-out amplifiers 51, 52, 53 and 54. The memory device 50 has a plurality of capacitors 55, one side of the capacitors 55 being grounded and the other (open-circuited) side thereof being connected to suitable contact points 56 which are spaced equal distances apart on the periphery of memory device 50. The memory device 50, including all of the capacitors 55, are rotated by shaft 17b (see FIGURE 1) in accordance with the movement of the downhole investigating apparatus, as discussed in FIGURE 1. The write-in and read-out contacts 50a, 50b, 50c and 50d, represented by the similarly designated arrows, are fixed relative to the rotation of the capacitor contact points 56. Thus, as the memory device 50 is rotated, each capacitor contact point 56 will, in turn, come into contact with the write-in and read-out points 50a–50d. The write amplifier 53, desirably, has a relatively low output impedance so that each capacitor 55 which comes into contact with read-in contact 50a will be quickly charged or discharged to the proper voltage. Likewise, the read-out amplifiers 51, 52 and 54 have relatively high input impedances so that the charge on each capacitor 55 which comes into contact with the read-out points 50b, 50c and 50d is preserved for later read out. In FIGURE 8, the intervals between write-in contact 50a and the read-out contacts 50b, 50c and 50d correspond to the depth intervals shown in FIGURES 5a and 5b for exemplary purposes, but the read-out points can be positioned as desired.

One other point that should be discussed in connection with the FIGURE 8 apparatus concerns the placement of the capacitors when the FIGURE 8 memory device is utilized in both memories of a particular signal processing system, e.g. memories 16 and 24 of FIGURE 1. First, the depth intervals between the capacitors of both memories should be equal. To determine what this interval should be, the depth intervals between the computing stations, i.e., the intervals between the write-in contact and read-out contact of memory 16 and the write-in and read-out contacts of memory 24 should be noted. In FIGURE 1, for example, these intervals are $d_1$, $2d_1$ and $4d_1$. Next, the lowest common denominator LCD of these intervals is determined, which comes out to be $d_1$ in the FIGURE 1 case. The intervals between computing stations do not have to be an integer times the interval between the computing stations represented by the arrows $S_n$ and $S_{n-1}$, as in the FIGURE 6b case. In the FIGURE 6b case, the LCD would be $\frac{1}{4}d_1$.

Now, the interval between capacitors is selected to correspond to the lowest common denominator divided by an integer greater than zero, i.e., $LCD/N$. The higher the integer, the closer the capacitors, and thus the closer the sampling of the derived well logging signals will be. Thus, for example, in FIGURE 1, the capacitors could be at intervals of $d_1$, or $d_1/2$, or $d_1/3$, etc. In determining the depth interval between capacitors, both the physical spacing between capacitors, which affects the total number of capacitors required, and the rate of rotation of the memory in terms of borehole depth (e.g., revolutions per foot) must be taken into account. This procedure could also be used to determine the sampling interval for other types of memories where signals are stored at discrete intervals, e.g., the digitizing rate of an analog-to-digital converter for a digital memory device.

It is to be understood that the techniques set forth in the present invention can be utilized with a wide variety of V.G.F.'s besides the ones specifically shown herein. In utilizing the techniques of the present invention, it may sometimes be found, depending on the particular V.G.F. shape being used, that undesired portions of the difference V.G.F. may not be cancelled out completely, but even in such cases it will usually be found that the final computed V.G.F. will be substantially improved.

Figure 9:
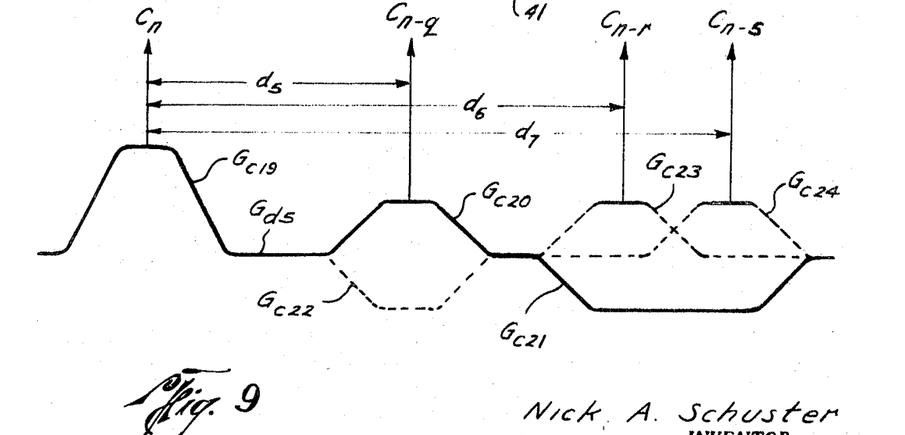
FIGURE 9 represents graphically still other vertical geometrical factors useful in understanding other features of the present invention.

It is also to be noted that the computed V.G.F. components can be added or subtracted more or less as desired. Thus, looking at FIGURE 9, there is shown a difference V.G.F. curve $G_{d5}$ (solid line curve) having component V.G.F.'s $G_{c19}$, $G_{c20}$ and $G_{c21}$. The original apparatus V.G.F.'s that produced the difference V.G.F. are not shown. Consider component V.G.F. $G_{c19}$ to be the final computed V.G.F., its center or recording point being designated by the arrow $C_n$. Since component V.G.F. $G_{c20}$ is positive, a negative computed V.G.F. component $G_{c22}$, whose center point is designated by the arrow $C_{n-q}$, located a distance $d_5$ from the arrow $C_n$, is combined with the difference V.G.F. In apparatus terms, this is taken care of by utilizing a polarity reversing amplifier in the weighting function circuit, or reversing the polarity of the particular read-out amplifier, if the weighted adding network is a passive network.

It is also to be understood that the computed V.G.F. components which are combined with the difference V.G.F. can overlap, if desired. Thus, in FIGURE 9, two non-overlapping computed V.G.F. components $G_{c23}$ and $G_{c24}$, whose center points are designated by the arrows $C_{n-r}$ and $C_{n-s}$ located distances of $d_6$ and $d_7$ respectively from the arrow $C_n$, are utilized to cancel out the undesired component V.G.F. $G_{c21}$. Thus, in apparatus terms, the computed signals $C_{n-q}$, $C_{n-r}$ and $C_{n-s}$ would be the stored computed signals read out at depth intervals of $d_5$, $d_6$ and $d_7$ respectively from the memory point where the computed signal $C_n$ is written in.

In some cases, it may be advantageous to combine the techniques set forth in the present invention with the teachings of the above-mentioned Doll Patent 3,166,709. In such cases, the computational process of the Doll patent could then be used to provide a preliminary processing of the apparatus V.G.F.

Figure 10:
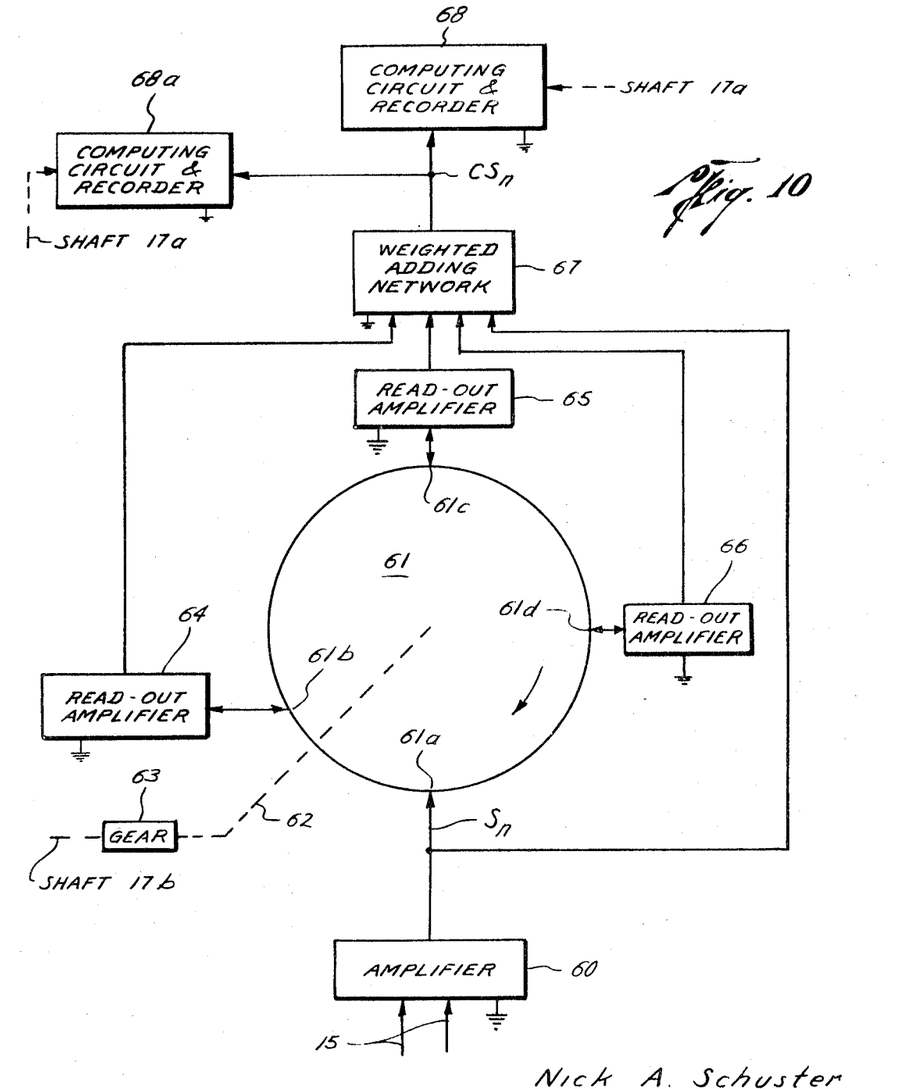
FIGURE 10 represents another embodiment of signal processing apparatus in accordance with the present invention.

Looking now at FIGURE 10, there is shown one manner of apparatus for accomplishing this preliminary processing or "preparing" of the original V.G.F. for utilization with the apparatus of FIGURE 1. In FIGURE 10, the well logging signal derived from the downhole investigating apparatus is supplied to an amplifier 60 which provides the proper ground reference potential. The output of amplifier 60 is supplied to a write-in contact 61a on a rotating memory 61, which rotating memory 61 is driven by a shaft 62 from a gear 63 to which is connected the shaft 17b of FIGURE 1. The gear 63 provides the desired speed of rotation of memory 61 with respect to the other memories of FIGURE 10.

A plurality of read-out amplifiers 64, 65 and 66 have their inputs connected to a plurality of read-out points 61b, 61c and 61d respectively of memory 61. The outputs of the read-out amplifiers 64, 65 and 66 and amplifier 60 are all supplied to the different inputs of a weighted adding network 67. The output from weighted adding network 67 is supplied to a computing circuit and recorder 68 which corresponds to that portion of the FIGURE 1 circuits enclosed by the dash-dot box 68 of FIGURE 1. The positions of the read-out points of memory 61 and the magnitude and polarity of the weighting function within weighted adding network 65 are all constructed in accordance with the teachings of the above-mentioned Doll patent and need not be discussed further in this application.

The derived well logging signals on conductor 15, after amplification by amplifier 60, are written into memory 61 at write-in point 61a and read out at later depth levels from read-out points 61b, 61c and 61d. The output signal from weighted adding network 61, designated $CS_n$, may be thought of as a computed signal corresponding to a new apparatus V.G.F. Insofar as the teachings set forth in FIGURES 1 through 9 of this application are concerned, this computed signal $CS_n$ is treated in precisely the same way as the derived signal $S_n$ referred to in connection with the earlier figures. That is to say, the V.G.F. for $CS_n$ is treated in the same manner as if it were an original apparatus V.G.F. and the subsequent graphical procedure is carried out in the same manner as previously discussed. The preprocessed V.G.F. represented by $CS_n$ may be normalized by multiplying such signal by a constant. This constant is such as to make the area of the preprocessed V.G.F. equal to the area of the original apparatus V.G.F.

The teachings of the present invention open the door to many possibilities for providing new and improved indications of measured characteristics of earth formations adjoining a borehole besides the ones specifically mentioned in this application. For example, parallel computer circuits could be utilized to provide more than one log of the characteristic or characteristics of the adjoining earth formations, wherein the different logs represent investigation of the adjoining earth formations by apparatus having different V.G.F.'s. This is represented in FIGURE 10 by the computing circuit and recorder 68a to which is also supplied the preprocessed or computed derived signal $CS_n$. This could be accomplished by having different intervals between the subtracted preprocessed V.G.F.'s (or original apparatus V.G.F.'s if preprocessing is not used). This can be seen by referring back to FIGURES 2a, 3a, 5a and 6a where it was shown that the intervals $d_1$, $d_2$, $d_3$ and $d_4$ between the original apparatus V.G.F.'s cause the final computed V.G.F.'s to have different vertical resolution (i.e. the width of the final computed VG.F.'s).

At the bottom of the borehole, the derived signal $S_n$ in FIGURE 10, is written into memory 67 in the same manner as previously discussed in connection with the other memories. The computed derived signal $CS_n$ is then written into the memories of computing circuits 68 and 68a in the same manner as the derived signal $S_n$ was read therein.

It is also to be understood that, while the weighting factor applied to the read-out derived signal $S_{n-1}$ has been the same as that of the derived signal $S_n$ heretofore, it is not limited thereto and could have any desirable weight. The procedure for selecting the weighting functions and memory write-in and read-out points would be essentially the same in this case also.

Figure 11A:
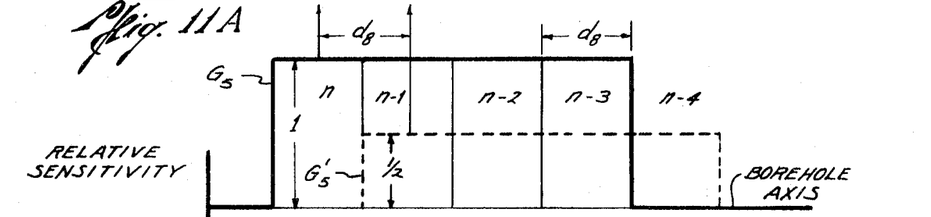
FIGURES 11a, 11b, 11c and 12 represent another embodiment of the present invention.
Figures 11B, 11C:
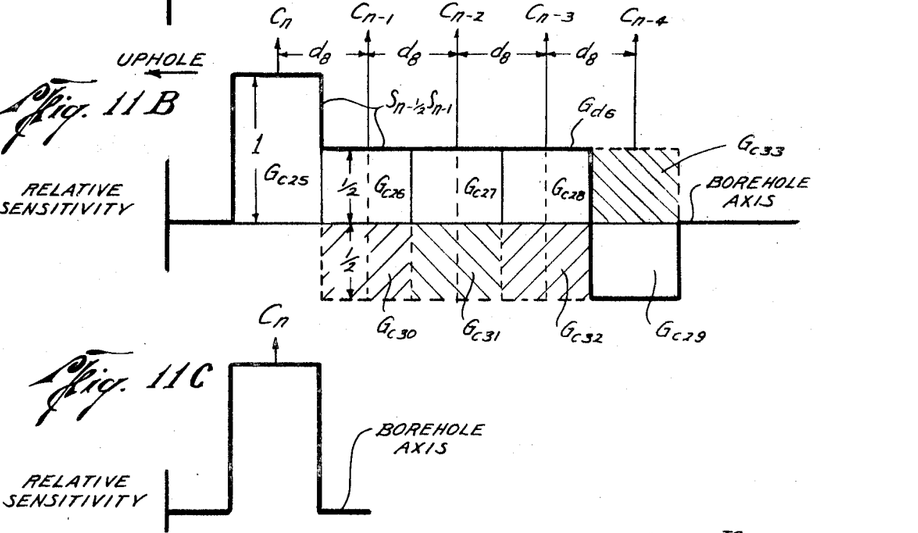

Referring to FIGURES 11a–11c, there is shown an example of this. FIGURE 11a shows a V.G.F. $G_5$ (like the V.G.F. $G_4$ of FIGURE 7a but squared up for simplicity of description) corresponding to the derived signal $S_n$ and a V.G.F. $G_5'$ corresponding to the weighted derived signal $\frac{1}{2}S_{n-1}$ (i.e. the derived read-out signal $S_{n-1}$ after weighting by the factor $\frac{1}{2}$). FIGURE 11a also shows the earth slabs $n$ through $n-5$, each of thickness $d_8$.

Now referring to FIGURE 11b, there is shown the difference V.G.F. $G_{d6}$ corresponding to $S_n - \frac{1}{2}S_{n-1}$ (the solid line portion). This difference V.G.F. $G_{d6}$ is broken down into component V.G.F.'s $G_{c25}$, $G_{c26}$, $G_{c27}$, $G_{c28}$ and $G_{c29}$ (the nonhatched line portions). Assuming the component V.G.F. $G_{c25}$ to be the desired final computed V.G.F., the computed V.G.F. components $G_{c30}$, $G_{c31}$, $G_{c32}$, and $G_{c33}$ corresponding to read-out computed signals $C_{n-1}$, $C_{n-2}$, $C_{n-3}$ and $C_{n-4}$ are combined with the difference V.G.F. $G_{d6}$ to cancel out the undesired V.G.F. components $G_{c26}$–$G_{c29}$ to leave the final computed V.G.F. $G_{c25}$. These "added in" computed V.G.F.'s are the hatched line areas in FIGURE 11b. Again, for normalization, the difference signal $S_n - \frac{1}{2}S_{n-1}$ corresponding to difference V.G.F. $G_{d6}$ is multiplied by the normalization factor "3" which will make the area of the final computed V.G.F. $G_{c25}$ equal the area of the original derived V.G.F. $G_5$. This final computed V.G.F. is shown in FIGURE 11c. The equation for this operation is thus:

$$C_n = 3(S_n - \tfrac{1}{2}S_{n-1}) - \tfrac{1}{2}C_{n-1} - \tfrac{1}{2}C_{n-2} - \tfrac{1}{2}C_{n-3} + \tfrac{1}{2}C_{n-4} \quad (12)$$

Figure 12:
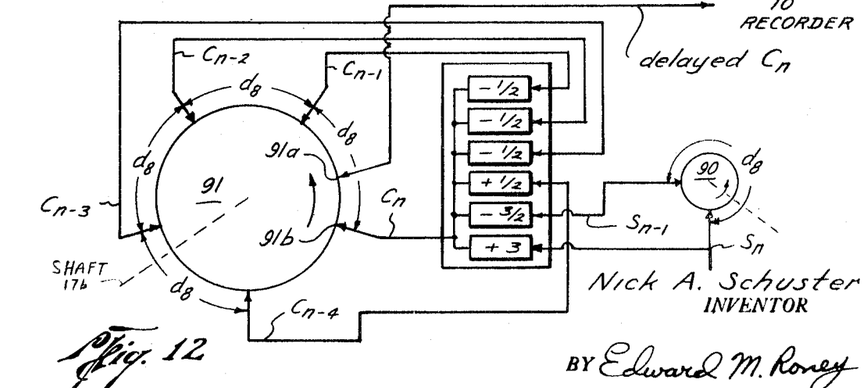

Referring to FIGURE 12, there is shown apparatus for performing the above operation. Since the memories, write-in and read-out amplifiers, weighting circuits, etc. have been described in detail in earlier embodiments, the FIGURE 12 apparatus is shown in functional diagram form only. In FIGURE 12, there is shown a rotating memory 90 for storing derived signals and a rotating memory 91 for storing computed signals. Both memories rotate in a counterclockwise direction. Memory 91 is geared down (not shown) to rotate slower than memory 90 (the depth intervals in a counterclockwise direction between write-in and read-out contacts on both memories is $d_8$, except for read-out contact 91a of memory 91 which supplies the delayed computed signal $C_n$ to the recorder (not shown)). The derived signal $S_n$, read-out derived signal $S_{n-1}$, and read-out computed signals $C_{n-1}$, $C_{n-2}$, $C_{n-3}$ and $C_{n-4}$ are all combined in a weighted adding network 92 in the weights in accordance with Equation 12 and the resulting computed signal $C_n$ written into memory 91 at write-in contact 91b. While only a rectangular type V.G.F. has been shown in FIGURE 11a to illustrate applying a weight to $S_{n-1}$ different than that applied to $S_n$, this could be accomplished for any V.G.F. of any given shape.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for processing well logging signals, comprising:
    (a) means for deriving signals representative of a characteristic of earth formations surrounding a borehole at different depth levels in the borehole, each of said derived signals being representative of the characteristic in a given portion of a formation;
    (b) first memory means for storing the derived signals;
    (c) means for reading out the stored derived signals at later times to produce a derived signal from a previously investigated depth level;
    (d) means for subtracting one of each derived signal or each read-out stored derived signal from the other of said signals to provide a difference signal;
    (e) means for combining each difference signal with at least one other signal to provide a computed signal correlated in depth with the derived signals;
    (f) second memory means for storing the computed signals; and
    (g) means for reading out individual stored computed signals from the second memory means at later times and supplying at least one of the read-out computed signals to the combining means to provide said at least one other signal which is combined with any given derived signal, said at least one read-out computed signal operating to cancel at least one selected formation response portion of each difference signal.

2. The apparatus of claim 1 wherein the means for deriving a signal includes a downhole investigating means having a given original vertical geometrical factor and adapted for movement through the borehole, and the computed signal represents the formation characteristic as if the downhole investigating apparatus had a vertical geometrical factor of improved vertical response.

3. The apparatus of claim 2 and further including recorder means responsive to the computed signals for providing a continuous log of the characteristic of the surrounding earth formations corresponding to a vertical geometrical factor of improved response relative to the response of the original vertical geometrical factor.

4. The apparatus of claim 1 wherein the means for combining the difference signal $S_n - S_{n-1}$ with the read-out computed signal $C_{n-u}$ to produce each computed signal $C_n$ combines the signals in accordance with the relationship:

$$C_n = x(S_n - S_{n-1}) + y C_{n-u}$$

where $x$ and $y$ are weighting factors of positive or negative polarity.

5. The apparatus of claim 1 wherein said at least one read-out computed signal comprises a plurality of read-out computed signals $C_{n-u} \ldots C_{n-m}$ corresponding to the investigated characteristic at different levels in the borehole, and the combining means combines the difference signal $S_n - S_{n-1}$ with the read-out computed signals to produce the new computed signal $C_n$ in accordance with the relationship:

$$C_n = x(S_n - S_{n-1}) + C_{n-u} + \ldots + z C_{n-m}$$

where, $x$, $y$ and $z$ are weighting factors of positive or negative polarity.

6. A method of processing well logging signals, comprising:
    (a) deriving signals representative of a characteristic of earth formations surrounding a borehole at different depth levels in the borehole, each of said derived signals being representative of the characteristic in a given portion of a formation;
    (b) storing the derived signals;
    (c) reading out the stored derived signals;
    (d) subtracting one of each derived signal or read-out stored derived signal from the other of said signals to produce a difference signal;
    (e) combining each difference signal with at least one other signal to produce a computed signal correlated in depth with the derived signals;
    (f) storing the computed signals; and
    (g) reading out individual stored computed signals at later times and using at least one of the read-out computed signals to provide said at least one other signal which is combined with any given derived signal, said at least one read-out computed signal operating to cancel at least one selected formation response portion of each difference signal.

7. The method of claim 6 and further including the step of recording the computed signals as a function of depth to provide a log of the formation characteristic.

8. The method of claim 7 wherein the derived signals correspond to investigation by a given original vertical geometrical factor, the recorded computed signals corresponding to a vertical geometrical factor of improved resolution.

9. The method of claim 6 wherein the step of combining includes:
    (1) subtracting a selected read-out stored derived signal $S_{n-1}$ from each derived signal $S_n$ to provide difference signals $S_n - S_{n-1}$; and
    (2) combining each difference signal $S_n - S_{n-1}$ with at least one read-out computed signal $C_{n-u}$ to produce each new computed signal $C_n$ in accordance with the relationship:

$$C_n = x(S_n - S_{n-1}) + y C_{n-u}$$

where $x$ and $y$ are weighting factors of positive or negative polarity.

10. The method of claim 6 wherein the step of combining includes:
    (1) subtracting a selected read-out stored derived signal $S_{n-1}$ from each derived signal $S_n$ to provide difference signals; and
    (2) combining each difference signal $S_n - S_{n-1}$ with a plurality of read-out computed signals $C_{n-u} \ldots C_{n-m}$ to produce each new computed signal $C_n$ in accordance with the relationship:

$$C_n = x(S_n - S_{n-1}) + y C_{n-u} + \ldots + z C_{n-m}$$

where $x$, $y$ and $z$ are weighting factors of positive or negative polarity.

11. Apparatus for processing well logging signals, comprising:
    (a) means for deriving signals representative of a characteristic of earth formations surrounding a borehole at different depth levels in the borehole, each of said derived signals being representative of the characteristic in a given portion of a formation;
    (b) first memory means for storing the derived signals;
    (c) means for reading out the stored derived signals;
    (d) means for combining a plurality of the derived signals to produce a computed derived signal representative of the formation characteristic at a given depth level correlated with the depth levels of the derived signals, at least one of the plurality of combined derived signals representing a read-out derived signal;

(e) second memory means for storing the computed derived signals;

(f) means for reading out the stored computed derived signals from the second memory means;

(g) means for combining each computed derived signal with a read-out stored computed derived signal and at least one other signal to provide computed signals representative of the formation characteristic at different depth levels which depth levels are correlated with the depth levels for the derived signals;

(h) third memory means for storing the computed signals; and (i) means for reading out individual stored computed signals from the third memory means at later times and supplying at least one of the read-out computed signals to the second-mentioned combining means to provide said at least one other signal which is combined with any given computed derived signal whereby said at least one read-out computed signal operates to cancel out selected formation response portions of each derived signal to leave sharp formation response computed signals.

12. A method of processing well logging signals, comprising:

(a) deriving signals representative of a characteristic of earth formations surrounding a borehole at different depth levels in the borehole, each of said derived signals being representative of the characteristic in a given portion of a formation;

(b) storing the derived signals;

(c) reading out the stored derived signals;

(d) combining a plurality of the derived signals to produce a computed derived signal representative of the formation characteristic at a given depth level correlated with the depth levels of the derived signals, at least one of the plurality of combined derived signals representing a read-out derived signal;

(e) storing each computed derived signal;

(f) reading out the computed derived signals;

(g) combining each computed derived signal with a read-out stored computed derived signal and at least one other signal to provide computed signals representative of the formation characteristic at different depth levels which are correlated with the depth levels of the derived signals;

(h) storing the computed signals; and (i) reading out individual stored computed signals at later times, at least one of the read-out computed signals representing said at least one other signal which is combined with any given computed derived signal whereby said at least one read-out computed signal operates to cancel out selected formation response portions of each derived signal to leave sharp formation response computed signals.

13. A method of processing well logging signals, comprising:

(a) deriving a first signal representative of a characteristic of earth formations surrounding a borehole at a first depth level in the borehole, each of said derived signals being representative of the characteristic in a given portion of a formation;

(b) storing the first derived signal;

(c) deriving a second signal representative of the characteristic at a second depth level in the borehole;

(d) reading out the first derived signal;

(e) subtracting the read-out derived signal from the second derived signal to produce a first difference signal which is correlated in depth with the derived signals;

(f) combining the first difference signal with at least one other signal to provide a first computed signal which is correlated in depth with the derived signals;

(g) storing the first computed signal;

(h) deriving a third signal representative of the characteristic at a third depth level in the borehole;

(i) storing the third derived signal;

(j) deriving a fourth signal representative of the characteristic at a fourth depth level in the borehole;

(k) reading out the third derived signal;

(l) subtracting the third read-out signal from the fourth derived signal to provide a second difference signal which is correlated in depth with the derived signals;

(m) reading out the first computed signal;

(n) combining the second difference signal with at least the first computed signal to provide a second computed signal which is correlated in depth with the derived signals, said at least one other signal combined to provide the first computed signal representing a read-out computed signal at another depth level; and (o) recording the computed signals to provide a log of the formation characteristic.

14. A method of processing well logging signals, comprising:

(a) deriving signals representative of a characteristic of earth formation surrounding a borehole at different depth levels in the borehole, each of said derived signals being representative of the characteristic in a given portion of a formation;

(b) subtracting the signal derived at one depth level from the signal derived at another depth level to produce a difference signal;

(c) combining each difference signal with at least one other signal to produce computed signals which are correlated in depth with the derived signals; and (d) storing the computed signals for subsequent use as said at least one other signal for combination with each difference signal, said stored computed signals operating to cancel out at least one selected formation response portion of each difference signal.

References Cited

UNITED STATES PATENTS

| | | | |
|---|---|---|---|
| 3,166,709 | 1/1965 | Doll | 324—6 |
| 3,181,117 | 4/1965 | Sloughter | 324—1 XR |
| 3,230,445 | 1/1966 | Sloughter et al. | 324—6 |

GERARD R. STRECKER, Primary Examiner

U.S. Cl. X.R.

340—172.5